United States Patent [19]

Hines

[11] Patent Number: 4,650,305

[45] Date of Patent: Mar. 17, 1987

[54] CAMERA MOUNTING APPARATUS

[75] Inventor: Stephen P. Hines, Glendale, Calif.

[73] Assignee: HinesLab, Glendale, Calif.

[21] Appl. No.: 810,780

[22] Filed: Dec. 19, 1985

[51] Int. Cl.$^4$ ............................................. G03B 35/08
[52] U.S. Cl. .................................... 354/113; 354/293; 352/59
[58] Field of Search ........................ 354/113, 293, 81; 352/57, 59, 60, 62, 65, 243

[56] References Cited

U.S. PATENT DOCUMENTS

| | | | |
|---|---|---|---|
| 2,706,938 | 4/1955 | Kiel | 352/59 |
| 2,838,975 | 6/1958 | Laube et al. | 352/59 |
| 2,868,065 | 1/1959 | Tondreau | 354/113 |
| 4,557,570 | 12/1985 | Hines | 354/113 |

Primary Examiner—A. A. Mathews

[57] ABSTRACT

Disclosed herein is camera mounting apparatus which is particularly useful for independently adjusting the interocular spacing and convergence distance between the respective optical axes of a pair of cameras used in three-dimensional (3-D) photography. Such apparatus comprises a pair of slider mechanisms, each including a slider member which is connected to a camera housing (e.g., via a camera support plate) and movable along a rectilinear path defined by its respective mechanism. One of the slider mechanisms is mounted for pivotal movement about an axis which perpendicularly intersects the respective paths of both slider members. Separate means are provided for (a) adjusting the positions of the slider members along their respective sliding paths, and (b) adjusting the angular relationship of one sliding path relative to the other, whereby the camera support plate is movable through a predetermined interocular spacing (e.g. 4.5 inches) along a segment of a path having a radius of curvature which is adjustable through a desired convergence range (e.g. between 3 feet and infinity).

7 Claims, 7 Drawing Figures

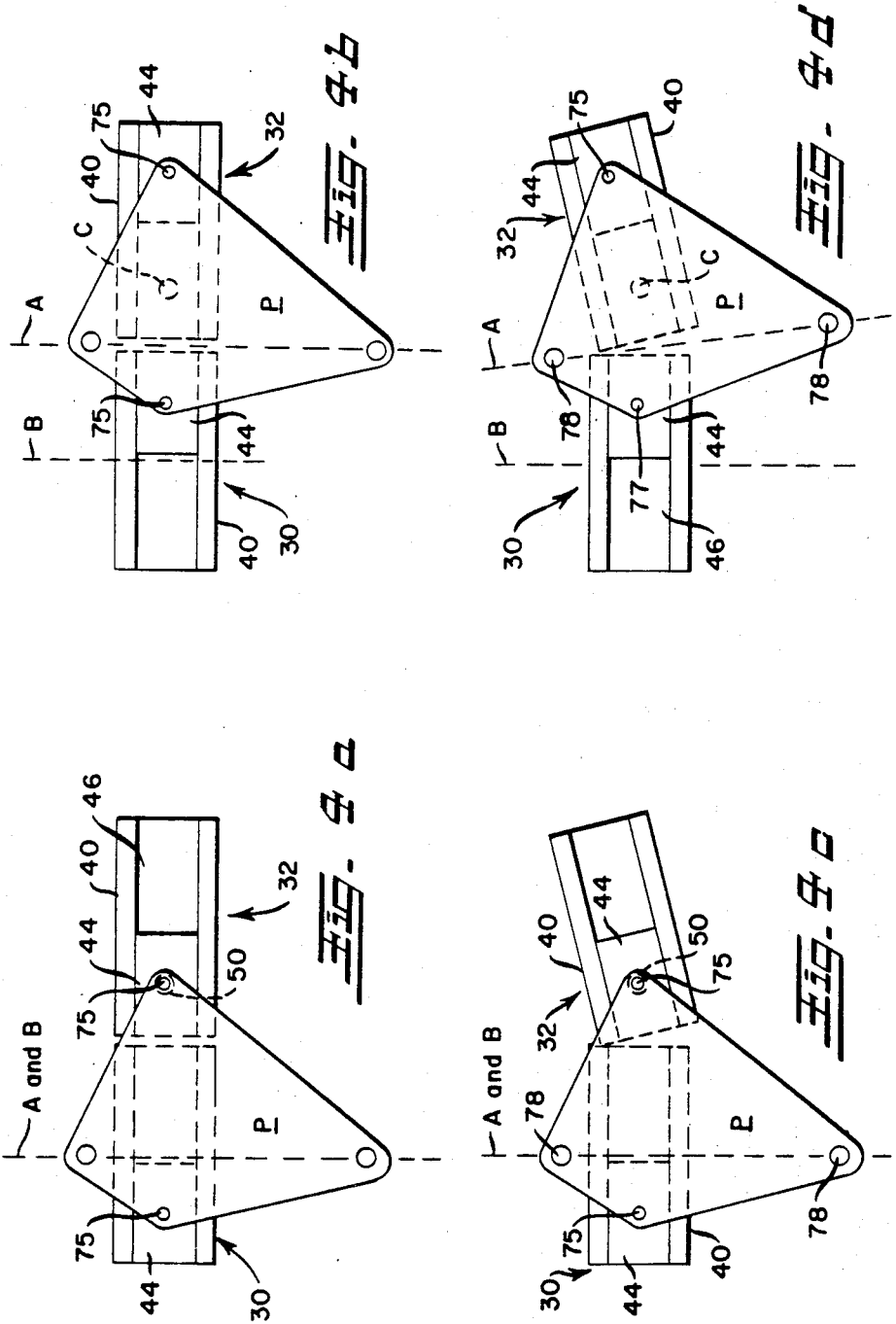

CAMERA MOUNTING APPARATUS

BACKGROUND OF THE INVENTION

This invention relates to a camera mount which is particularly useful in three-dimensional (3-D) photography for controlling the so-called "interocular" spacing and convergence distance between the respective optical axes of a pair of 3-D cameras for the purpose of producing different three-dimensional effects.

The production of three-dimensional photographs, both cine and still, is well known in the art and usually involves the use of two cameras which record the same scene from different perspectives. Typically, the nominal effective lateral displacement between the respective optical axes of the cameras, known as the interocular spacing, is approximately equal to the average spacing between the eyes of a viewer (i.e. about 2.5 inches). This spacing would produce the same 3-D effect as that perceived by a viewer who viewed the scene from the camera location. A greater or lesser interocular spacing is sometimes desirable to produce greater or lesser depth. Hence, conventional 3-D camera systems commonly include some means for adjusting the position of one camera relative to the other to vary the interocular spacing over a continuous range from zero to about 4 or 5 inches.

Aside from interocular spacing adjustment, 3-D effects can also be controlled by varying the convergence distance at which the optical axes of the respective 3-D cameras intersect. When 3-D images are projected for viewing, such convergence distance determines the distance at which objects within the scene appear to be located relative to the projection screen. When the convergence angle is such that the camera axes intersect at, say, thirty feet in front of the cameras, objects in the foreground and background will appear to a viewer to be positioned in front of and behind the screen, respectively. Special well known 3-D effects can be achieved in 3-D motion picture photography by varying the convergence distance during filming, and conventional 3-D camera systems commonly include means for adjusting the position of one camera relative to the other to vary such distance over a continuous range between infinity and about four feet.

An apparatus for precisely moving one 3-D camera relative to the other to produce independent interocular spacing and/or convergene distance adjustments is disclosed in my co-pending U.S. patent application, Ser. No. 535,991, filed on Sept. 26, 1983 and assigned to Walt Disney Productions, now U.S. Pat. No. 4,557,570. Such apparatus comprises a four-bar linkage which includes a pair of relatively long side links pivotally connected between a pair of comparatively shorter end links. One of the end links is fixed to a frame, and the other end link is secured to a movable camera. Swinging movement of the side links alters the interocular spacing between the movable camera and a fixed camera, and shifting the relative positions of the pivot points of the side links alters the convergence distance. While such apparatus is quite effective in providing independent interocular spacing and convergence distance adjustments the linkage assembly is somewhat complex in construction and bulky in physical size, the latter disadvantage limiting its usage, and the former its cost and reliability.

SUMMARY OF THE INVENTION

In view of the foregoing discussion, an object of this invention is to provide a more compact and simpler apparatus of the type described for adjusting the position of one camera of a 3-D system relative to the other so as to independently adjust the interocular spacing and convergence distance of such cameras.

This object is achieved by the provision of a camera mounting apparatus which comprises a pair of slider mechanisms, each comprising a movable slider member and guide means for guiding the slider member along a rectilinear path. Each of the slider members is connected to a camera support plate and means are provided for pivotally mounting one of the slide guides for pivotal movement about an axis which perpendicularly intersects the sliding path of each slider member. Separate means are provided for simultaneously adjusting the position of both slider members along their respective sliding paths, and for adjusting the position of the pivotally mounted slide guide to adjust the angular relationship of one sliding path relative to the other. By this arrangement, the camera support plate is movable through a desired interocular spacing (e.g. up to 4 or 5 inches) along a path having a center of curvature which is adjustable through a desired convergence range (e.g. between 3 feet and infinity).

The invention and its advantages will be better understood from the ensuing description of a preferred embodiment, reference being made to the accompanying drawings.

BRIEF DESCRIPTION OF THE DRAWINGS

FIGS. 4A-4D illustrate the respective positions of the components of the camera mounting apparatus of the invention for different combinations of interocular spacing and convergence distance.

DETAILED DESCRIPTION OF PREFERRED EMBODIMENTS

Figure 1:
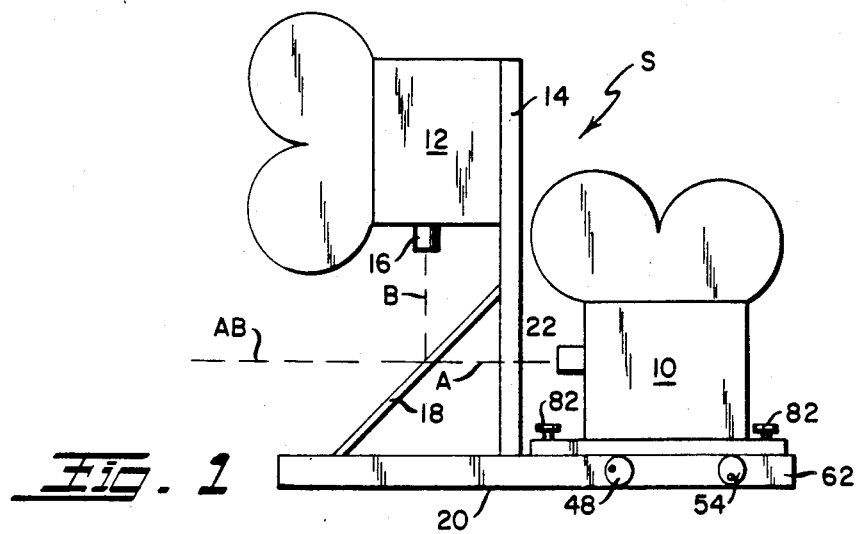
FIG. 1 is a side elevational view of a pair of cameras comprising a 3-D camera system.

Referring now to the drawings, FIG. 1 illustrates the conventional arrangement of two motion picture cameras 10,12 of a three-dimensional (3-D) photographic recording system S. One camera 12 is rigidly mounted in a fixed position to a vertical support 14, and its objective lens 16 receives light from the scene upon being reflected vertically by a half-silvered beam-splitter 18 arranged at a 45 degree angle relative to the horizontal plane. The other camera 10 is mounted on a horizontal base plate 20 by means of an adjustable camera mount M, described in detail below. The function of the adjustable camera mount M is to provide a means for adjusting, in a precise and controlled manner, the position of the optical axis A of the movable camera's objective lens 22 relative to the fixed optical axis B of the fixed camera 12. Such adjustment takes place in the horizontal plane only. The camera mount described below enables the interocular spacing between lenses 16 and 22 to be adjusted from zero to, say, 4.5 inches, and the convergence distance at which the axes A and B cross to be independently adjusted between infinity and 3 feet.

Figure 2:
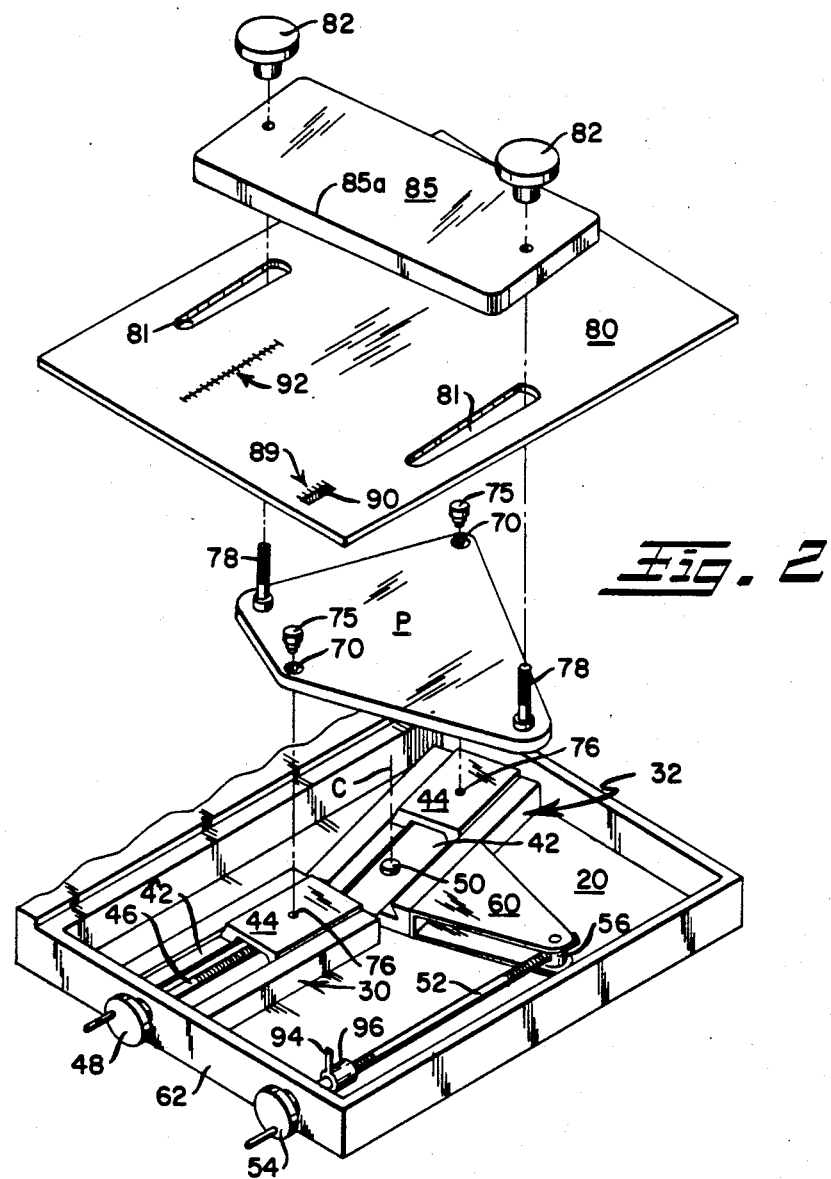
FIG. 2 is an exploded view of the camera mounting apparatus of the invention.

Referring to the exploded view of FIG. 2, camera mount M is shown to comprise a pair of slide mechanisms 30,32 which are supported by base plate 20. While slide mechanism 30 is rigidly connected to plate 20 in the fixed position shown, slide mechanism 32 is pivotally mounted to plate 20 for pivotal movement about a fixed vertical axis C. Each of the slide mechanisms may take the form of a UniSlide Assembly, made by Velmex, Inc. East Bloomfield, N.Y. Such a device comprises a slide guide 40 having a rectilinear guide slot or channel 42 of dove-tail cross-section formed therein, and a slider member 44 of like cross-section positioned to be guided along a rectilinear guide path defined by the slide guide's channel.

Figure 3:
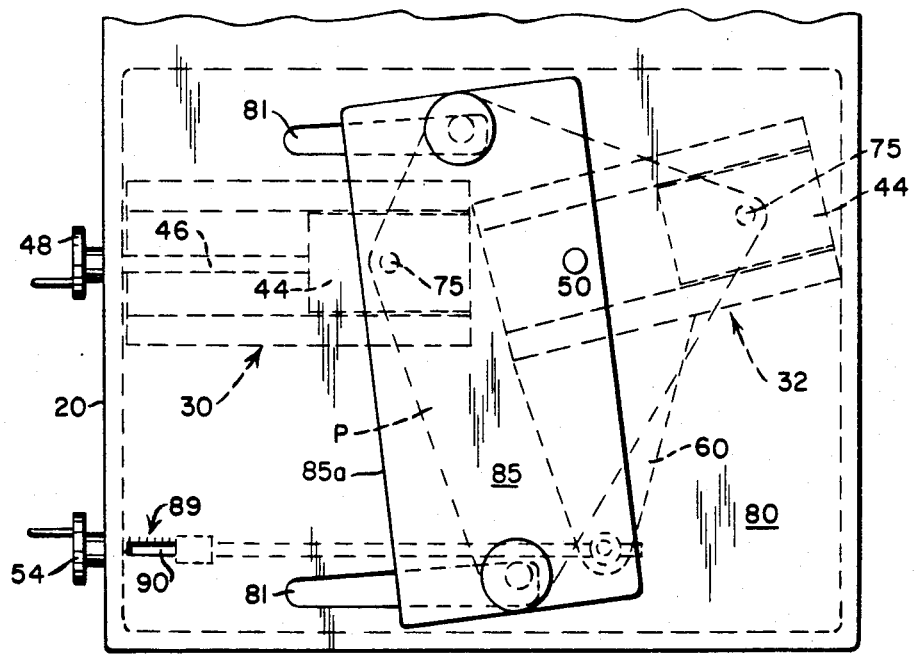
FIG. 3 is a top view of the apparatus shown in FIG. 2.

Fixed slide mechanism 30 is provided with a lead screw 46 and crank 48 for adjusting the position of the slider member within the slide guide. One end of the lead screw is threaded into the base of the slider member and, as the lead screw is rotated by the crank (which is rigidly coupled to the screw's opposite end), the slider member is pushed or pulled along the rectilinear path of the slide guide. Slide mechanism 32 has no such slide adjustment means, and its slider member is freely movable in its respective guide. The base of mechanism 32, however, is provided with an aperture for receiving a pivot pin 50 which is rigidly mounted on and extends upwardly from plate 20. The longitudinal axis of pin 50 is colinear with axis C which, as best shown in FIG. 3, perpendicularly intersects both slide paths. Owing, for example, to a relieved underside of the slider member of mechanism 32, pin 50 does not interfere with the free movement of the slider member in its guide. A second lead screw 52 and crank 54 is used to control the pivotal position of mechanism 32 about pin 50. One end of such lead screw is connected to a rotatably mounted member 56 which spans the ends of a triangularly-shaped yoke 60 which is rigidly connected to the slide guide of mechanism 32. Crank 54 is connected to the opposite end of screw 52. Like lead screw 46, screw 52 is mounted for rotation on one side of a frame 62 which surrounds the base plate.

Positioned atop the slide mechanism is a camera support plate P which couples the movable camera 10 to the slide mechanism 30,32. Plate P is provided with a pair of apertures 70,72 through which pivot posts (threaded bolts) 75 can connect plate P to threaded apertures 76 formed in the center of the slider members 44. A pair of threaded uprights 78 which extend upwardly from plate P are used to connect plate P with the camera. Preferably, the entire assembly described is covered by a dust cover 80 having slots 81 for receiving uprights 78. Camera 10 may be secured to an auxilliary camera plate 85 (shown in FIGS. 2 and 3) which, in turn, is secured to the uprights by a pair of knobs 82.

In the top plan view of FIG. 3, the various components of the camera mount are shown in a position to produce a maximum interocular spacing and a minimum convergence distance. As depicted, slider members 44 are located in their extreme right position, thereby producing the maximum interocular spacing between the nodal points of the respective camera lenses. Also shown, is the slide mechanism 32 in its most rotated position about pin 50, whereby the convergence between axes A and B is reduced to about 3 feet. The convergence distance is displayed on a scale 89 located adjacent a slot 90 formed in cover 80. An indicator tab 94, extending from a female threaded member 96 which moves along lead screw 52 as the latter rotates to adjust the angular position mechanism 32 about pin 50, cooperates with scale 89 to indicate the convergence distance. The left edge 85a of plate 85 serves as an indicator to display the interocular spacing on a second scale 92 (shown in FIG. 2) carried by cover 80. To reduce the interocular spacing, crank 48 is rotated so that the slider member of mechanism 30 moves to the left; owing to the rigid coupling between the two slider members provide by plate P, the slider member of mechanism 32 tracks the movement of the slider member of mechanism 30.

To minimize any variation in convergence distance during adjustment of the interocular spacing, it is preferred that the nodal point of the adjustable camera's lens be located on a line connecting the centers of posts 75. Preferably, such nodal point is spaced from the post 75 connected to the fixed slide mechanism 30 by about one-half the desired maximum interocular spacing. Thus, for a maximum interocular spacing of 4.5 inches, the nodal point of the adjustable camera will be approximately 2.25 inches from the pivot post of mechanism 30, measured in the direction of the pivot post of mechanism 32.

The relative movement of the slide mechanisms and their respective slide members, and the effect on the position of the camera plate P is best illustrated in FIGS. 4A–4D. In FIG. 4A, both slider members are shown in their leftmost positions which provides a zero interocular spacing; that is, camera axes A and B are colinear. In this view, the rectilinear slide path provided by the pivotally mounted slide mechanism 32 is aligned with, i.e., parallel to the rectilinear path provided by fixed slide mechanism 30. By merely rotating crank 48, slider members 44 may be driven to the right, thereby increasing the interocular spacing between the camera axes to the spacing shown in FIG. 4B. Note, in FIGS. 4A and 4B, the convergence distance is at infinity, axes A and B remaining parallel.

In FIG. 4C, the slider members are again shown in their leftmost position, but, in this case, mechanism 32 is shown to be rotated somewhat about axis C, i.e., about pin 50. While this rotation would have an effect on the convergence distance were camera axes A and B to be separated, it has no effect when the axis of attachment bolt 75 of mechanism 32 is coincident with pin 50. As the slider members 44 are slid to the positions shown in FIG. 4D, plate P traverses an arcuate path having a radius of curvature equal to the convergence setting, as determined by the angular position of mechanism 32 about axis C.

From the foregoing description, it is apparent that the camera mount of the invention is relatively simple in construction, and especially compact and, hence, lightweight in physical size. The interocular spacing and convergence distance are independently adjustable by merely rotating cranks 48 and 54 respectively. If desired, the minimum convergence distance could be reduced to approach zero by merely increasing the permissible angle of rotation of slide mechanism 32. Note, too, that the maximum interocular spacing can be increased by simply increasing the length of the slide guide paths of the slide mechanisms.

While the invention has been described with particular reference to a preferred embodiment, various extensions and modifications will be self-evident to those skilled in the art. For example, it is apparent that the camera mount of the invention is not limited to use in 3-D systems and could be used to control camera position in any photographic system requiring the type of movement afforded by the apparatus described above. All such obvious extensions and modifications are intended to be embraced by the following claims which define my invention.

I claim:

1. In a 3-D photographic apparatus of the type comprising a pair of cameras, each having an objective lens for focusing light from a scene onto an image plane, camera mounting means for adjusting the position of one of said cameras relative to the other to independently vary (i) the effective interocular spacing and (ii) the convergence distance between the optical axes of said lenses, said adjusting means comprising:
   (a) a pair of slide mechanisms, each comprising a slider member and guide means defining a rectilinear slide path for said slider member, said guide means being arranged such that the slide paths defined thereby intersect a common axis extending perpendicular to said paths;
   (b) means of coupling said slide members to said one camera;
   (c) means for mounting one of said guide means for pivotal movement about said common axis;
   (d) means for adjusting the pivotal position of said one guide means about said common axis to adjust the angular relationship between said slide path from one in which said slide paths are parallel, to one in which said paths are angularly disposed; and
   (e) means for adjusting the positions of said slider members along their respective slide paths through a distance equal to a maximum desired interocular spacing.

2. The apparatus as defined by claim 1 wherein said coupling means comprises a pair of pivot posts, one being supported by each of said slider members, a camera support plate, and means for pivotally connecting said plate to each of said pivot posts.

3. The apparatus as defined by claim 2 wherein said support plate is arranged relative to said slider members such that when the interocular spacing between said camera is zero, said common axis substantially coincides with the axis of the pivot post supported by that slider member guided by said pivotally mounted guide means.

4. The apparatus as defined by claim 3 wherein said one camera is arranged on said support plate such that the nodal point of the camera's lens is located on a line connecting the center of said pivot posts.

5. The apparatus as defined by claim 4 wherein said nodal point is displaced from the pivot post of the other of said guide means by approximately one-half the maximum desired interocular spacing.

6. Camera mounting apparatus comprising:
   (a) a pair of slide mechanisms, each comprising a slider member and guide means defining a rectilinear slide path for said slider member, said guide means being arranged such that the slide paths defined thereby intersect a common axis extending perpendicular to said paths;
   (b) means of coupling said slide members to a camera;
   (c) means for mounting one of said guide means for pivotal movement about said common axis;
   (d) means for adjusting the pivotal position of said one guide means about said common axis to adjust the angular relationship between said slide path from one in which said slide paths are parallel, to one in which said paths are angularly disposed; and
   (e) means for adjusting the positions of said slider members along their respective slide paths.

7. The apparatus as defined by claim 6 wherein said coupling means comprises a pair of pivot posts, one being supported by each of said slider members, a camera support plate, and means for pivotally connecting said plate to each of said pivot posts.

* * * * *